I. A. BURNETT.
DENTAL AMALGAM MIXER.
APPLICATION FILED APR. 28, 1919.
1,308,038.
Patented July 1, 1919.
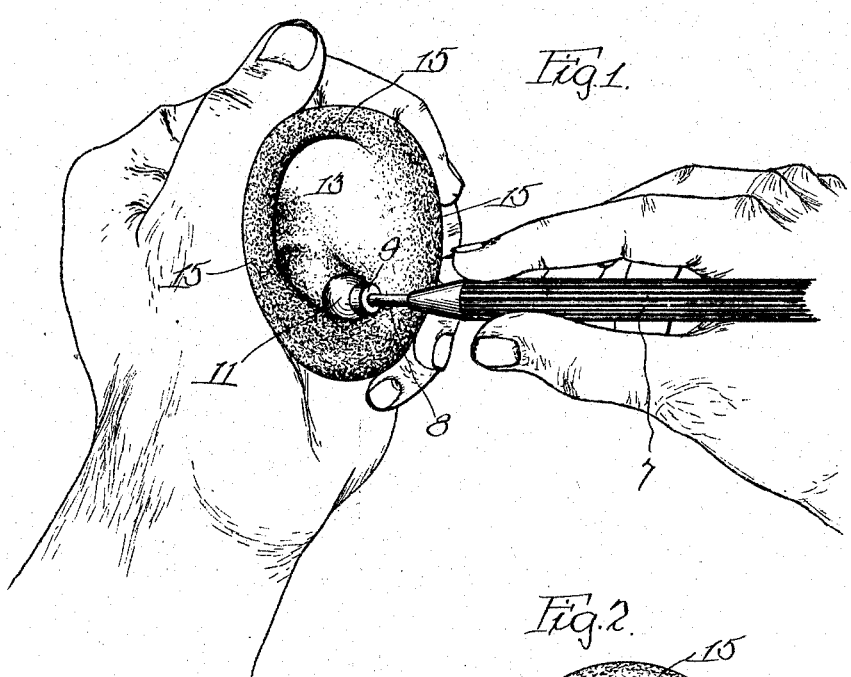
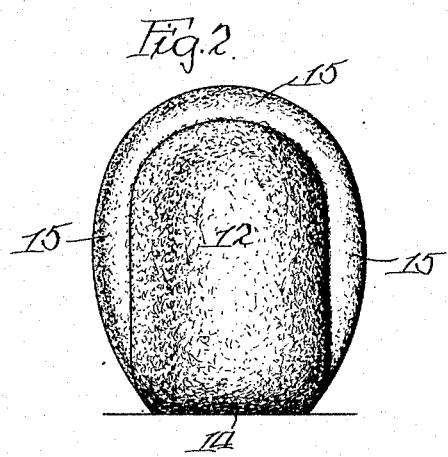
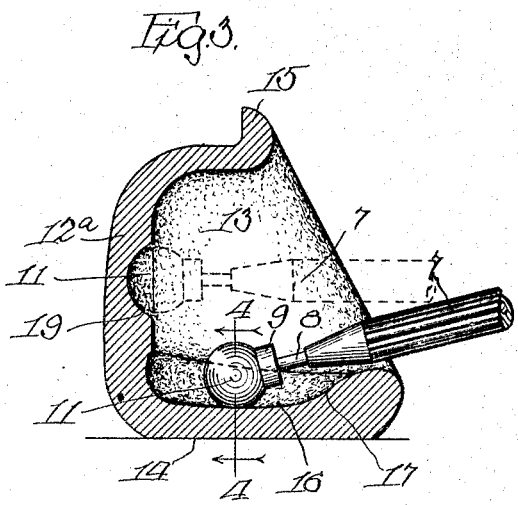
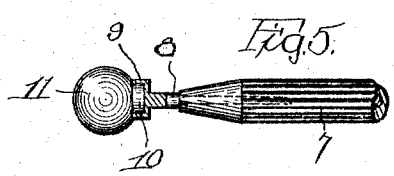
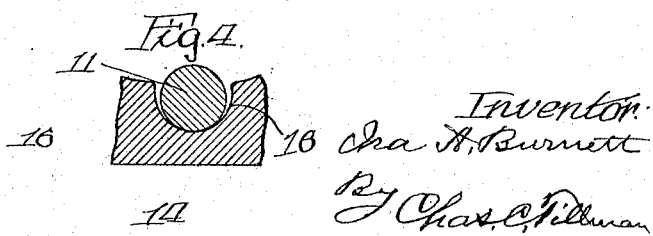

UNITED STATES PATENT OFFICE.

IRA A. BURNETT, OF CHICAGO, ILLINOIS.

DENTAL-AMALGAM MIXER.

1,308,038.　　　　　Specification of Letters Patent.　　Patented July 1, 1919.

Application filed April 28, 1919. Serial No. 293,255.

*To all whom it may concern:*

Be it known that I, IRA A. BURNETT, a citizen of the United States, residing at the city of Chicago, in the county of Cook and State of Illinois, have invented certain new and useful Improvements in Dental-Amalgam Mixers, of which the following is a specification.

This invention relates to improvements in a device for quickly pulverizing or grinding and thoroughly mixing materials or ingredients of various kinds, and while it is more particularly intended for the use of dentists in connection with a dental engine, for mixing the ingredients of amalgam for teeth filling or dental work, and while it is so illustrated in the accompanying drawing, yet I desire it to be understood that it may be employed for mixing, grinding or pulverizing any suitable kind of material, or used for any other purpose for which it may be found applicable, in conjunction with a dental engine, or otherwise, without departing from the spirit of the invention.

The principal object of the invention is to provide a mixing mortar or receptacle of such external shape or construction that it shall be especially adapted to fit in and be held in the desired position by one hand of the user, while the other hand may be employed for manipulating the pestle or mixing tool, or for any other purpose, or if desired, so that it can be placed and held in operative position on a flat surface, such as a table, and which mortar or receptacle shall be of such internal formation or construction as to coöperate with the mixing tool or pestle in such a manner as to permit of various kinds of movements thereof, to the end, that the mixing or treatment of the ingredients or material held by the mortar, will be accomplished quickly, thoroughly and in a most satisfactory and efficient manner. A further object is to furnish a mortar of such interior construction or foundation, that after the mixing of the ingredients forming the amalgam has been performed and the setting condition of the amalgam acquired, which is controlled by regulating the speed of the mixing operation, the pestle can be removed and the dentist or user can readily remove from an elongated mixing depression or groove in the wall of the cavity of the mortar, by the use of a finger, quite accurately the amount of amalgam desired for a filling or for the work for which it is required.

Still another object is to furnish a mixer which shall be attractive in appearance and simple and inexpensive in construction.

With the above mentioned objects in view, as well as others that will appear in the following description and explanation, the invention consists in certain peculiarities in the construction, novel arrangement and operation of the parts thereof, as will be hereinafter more fully set forth and specifically claimed.

In the accompanying drawing, which serves to illustrate an embodiment of the invention—

Figure 1 is a perspective view showing the mortar or receptacle of the mixer held in one hand of the user and the dental engine hand piece held by the other hand and in operative position in the trough of the cavity of the mortar or receptacle.

Fig. 2 is a rear external view of the mortar or mixing receptacle.

Fig. 3 is a central sectional view thereof showing the operative positions of the pestle.

Fig. 4 is a cross sectional view taken on line 4—4 of Fig. 3, and

Fig. 5 is a detailed view partly in section and partly in elevation of a portion of the engine hand piece showing the pestle mounted thereon.

Corresponding numerals of reference refer to like parts throughout the different views of the drawing.

The hand piece of the dental engine is designated by the reference numeral 7, and may be of the standard type or of the ordinary or well known construction, which, as is well known, is provided with a chuck (not shown), located therein near its front end for engagement with the mandrel or shaft of the grinding tool, bur, drill or other tool. In using the hand piece with my improved mixing receptacle, a shaft or mandrel 8, having on its outer or free end a cap 9, is inserted in the opening in the free end of the hand piece 7, and is engaged by the clutch therein in the usual manner. Fitted in the cap 9 is a neck 10 on a substantially spherical head or pestle 11, which is by preference made of ground glass and of any suitable size. The mortar or mixing receptacle is designated as a whole by the reference numeral 12, and is by preference made of ground glass and of substantially the shape shown in Figs. 1, 2 and 3 of the drawing, that is to say, it is provided with a cavity 13 extended from its front portion inwardly to a suitable depth. One of the surfaces of the mortar or receptacle, which may be termed its lower surface, is flattened as at 14, so as to stabilize it when mounted on a table or flat surface. Extended upwardly from the rear portion of the flat surface 14, the mortar is rounded both horizontally and vertically, and the upper and side portions thereof are provided around the mouth of the cavity 13 with a flange 15, which will rest against the thumb and finger tips when the receptacle is held in one hand, as shown in Fig. 1 of the drawing, in which position it will be understood that the bowl portion of the receptacle will snugly fit the hand when the fingers and thumb are positioned as shown. Within the lower portion of the cavity of the mortar the wall thereof is provided with a trough or groove 16, which extends from a point near the opening of the cavity to the rear portion 12ᵃ and, as shown at 17 in Fig. 3, is gradually reduced in depth toward its outer end. This trough or groove is by preference about semi-circular in cross section, and of such size as to closely fit around the lower portion or hemisphere of the spherical grinder 11 or pestle head. The inner surface of the rear wall 12ᵃ is provided about centrally thereof with a bowl-like depression 19, which is located a slight distance from the inner end of the trough, as is clearly shown in Fig. 3 of the drawing. By this arrangement or construction, it is apparent that the mortar may be located on a table in about the position shown in Fig. 3, or held in the hand in about the same position as shown in Fig. 1, when, by placing the grinding head or sphere 11 in the groove 16, said head, which will be rotated by the engine, may be moved back and forth in said groove, thus attaining a two-fold movement thereof to thoroughly mix the ingredients contained by the mortar and the groove thereof. By placing the mortar so that the mouth of its cavity will be located upwardly, and by holding the same in such position, it is apparent that the head or pestle 11 can be located in the depression 19 of the mortar and rotated by the engine as in the first named position, so as to thoroughly grind and mix the material in the depression 19, which may be desirable under certain conditions, for instance, if there is a very small amount of amalgam or material to be prepared. As the depression 19 is flared, it is obvious that the pestle can be gyrated in said depression, whether the head 11 thereof is rotated or not. This character of movement of the pestle and its head is found to be required under certain conditions. Of course the pestle can be moved back and forth or otherwise manipulated in the groove 16 without being rotated by the engine, and it is further obvious that a pestle of a suitable size not connected or operated by the dental engine may be used in connection with the mortar or receptacle. Another advantage in using the trough or groove 16, is, after the amalgam or material has been thoroughly mixed and the proper consistency thereof acquired, the pestle may be removed from the mortar, when the dentist can place his finger in the groove on the amalgam or material therein, and, by drawing it toward the mouth of the cavity, extract or remove from the groove or trough quite accurately the amount of amalgam necessary to be used in the cavity of the tooth or for the work required.

Having thus fully described my invention what I claim as new and desire to secure by Letters Patent is:

1. A mixing receptacle having in the wall of its cavity a trough or groove extended longitudinally between the open end of said cavity and the closed end thereof and of substantially semi-circular cross section.

2. A mixing receptacle having in the wall of its cavity a trough or groove extended longitudinally from a point near the open end of said cavity to the closed end thereof and of substantially semi-circular cross section, said groove diminishing in depth toward its outer end.

3. A mixing receptacle having in the wall of its cavity a trough or groove extended longitudinally between the open end of said cavity and the closed end thereof and of substantially semi-circular cross section, said receptacle also having in the closed end of its cavity a depression.

4. The combination with a mixing receptacle having in the wall of its cavity a trough or groove extended between the open end of said cavity and the closed end thereof, of a substantially spherical pestle head having its lower hemisphere, when in use, located in said groove.

5. The combination with a mixing receptacle having in the wall of its cavity a trough or groove extended longitudinally between the open end of said cavity and the closed end thereof and of substantially semi-circular cross section, said receptacle also having in the closed end of its cavity a depression, of a grinding head substantially spherical in shape adapted for location of its lower portion in said trough and said depression.

IRA A. BURNETT.